(12) United States Patent
Calabresse Muzzi

(10) Patent No.: US 8,388,007 B2
(45) Date of Patent: Mar. 5, 2013

(54) ROBUST BICYCLE HAVING HOLLOW UNITARY FRAME

(76) Inventor: Juan Carlos Calabresse Muzzi, Sao Paulo (BR)

( * ) Notice: Subject to any disclaimer, the term of this patent is extended or adjusted under 35 U.S.C. 154(b) by 209 days.

(21) Appl. No.: 12/908,035

(22) Filed: Oct. 20, 2010

(65) Prior Publication Data
US 2012/0098232 A1 Apr. 26, 2012

(51) Int. Cl.
B62K 19/18 (2006.01)
(52) U.S. Cl. .................................................. 280/288.3
(58) Field of Classification Search ............... 280/281.1, 280/288.3
See application file for complete search history.

(56) References Cited

U.S. PATENT DOCUMENTS

| | | | | |
|---|---|---|---|---|
| 2,370,726 A * | 3/1945 | Hess et al. | ............... | 280/281.1 |
| 2,763,496 A * | 9/1956 | Roder | .................. | 280/288.3 |
| 2,827,306 A * | 3/1958 | Roder | .................. | 280/288.3 |
| 3,233,916 A * | 2/1966 | Bowden | .................. | 280/274 |
| 3,329,444 A * | 7/1967 | Lidov | .................. | 280/210 |
| 4,230,332 A * | 10/1980 | Porsche | .................. | 280/288.3 |
| 4,941,674 A * | 7/1990 | Trimble | .................. | 280/281.1 |
| 5,215,322 A * | 6/1993 | Enders | .................. | 280/231 |
| 5,269,551 A * | 12/1993 | Martin et al. | .................. | 280/281.1 |
| 5,273,303 A * | 12/1993 | Hornzee-Jones | .................. | 280/288.3 |
| 5,769,442 A * | 6/1998 | Robinson et al. | .................. | 280/281.1 |
| 7,497,455 B2 * | 3/2009 | Kamalian | .................. | 280/281.1 |
| D606,908 S | 12/2009 | Grimaldi | | |
| D612,300 S | 3/2010 | Lobnitz | | |
| 2002/0063410 A1 * | 5/2002 | Buckmiller et al. | .................. | 280/274 |
| 2009/0212530 A1 * | 8/2009 | Sasnowski et al. | .................. | 280/288.3 |
| 2009/0267317 A1 | 10/2009 | Yang | | |
| 2010/0052285 A1 | 3/2010 | Wang et al. | | |
| 2010/0170746 A1 * | 7/2010 | Restuccia et al. | .................. | 181/290 |
| 2011/0133427 A1 * | 6/2011 | Bashan et al. | .................. | 280/210 |
| 2011/0306262 A1 * | 12/2011 | Arpin | .................. | 442/395 |

FOREIGN PATENT DOCUMENTS

| | | |
|---|---|---|
| CN | 101602389 A | 12/2009 |
| CN | 201367083 Y | 12/2009 |
| DE | 3804342 A1 * | 8/1989 |
| DE | 3812510 A1 * | 10/1989 |
| DE | 102008025689 A1 | 12/2009 |
| WO | 2009146550 A1 | 12/2009 |

* cited by examiner

*Primary Examiner* — Kevin Hurley
(74) *Attorney, Agent, or Firm* — Ronald E. Smith; Smith & Hopen, P.A.

(57) ABSTRACT

A bicycle construction includes a unitary frame having a "Y" shape formed by a central longitudinal bar, a lower bar and an arcuate medial bar. The central longitudinal bar is bifurcated at its trailing end, forming first and second rear wheel mounting members that are positioned on opposite sides of a longitudinal axis of symmetry of the unitary frame. A first bore formed in the common leading end of the central longitudinal bar and the lower bar accommodates a handlebar tube. A second bore formed in a trailing end of the central longitudinal bar accommodates a seat support tube. A third bore formed in a trailing end of the lower bar accommodates a primary socket wheel axle. Fourth and fifth bores formed in respective trailing ends of the first and second wheel mounting members in cooperatively aligned relation to one another accommodate a secondary sprocket wheel axle.

7 Claims, 4 Drawing Sheets

ROBUST BICYCLE HAVING HOLLOW UNITARY FRAME

BACKGROUND OF THE INVENTION

1. Field of the Invention

This invention relates, generally, to ergonomics improvements for a mono-block frame used in bicycles and the like. More particularly, it relates to a hollow mono-block frame formed entirely of an injection-molded thermoplastic polymer.

2. Description of the Prior Art

The mechanical safety and physical condition of the parts that make up a bicycle such as the frame, the brake system, the handlebar and the like, are important because they enable the cyclist to steer, brake, and to otherwise be safe during the ride. Accidents caused by a mechanical failure or breakage of a part can cause serious injury to the cyclist.

The frame of a conventional bicycle includes a set of extruded tubes that are typically manufactured with carbon steel, chrome-molybdenum and aluminum. Such frames are cut, bent and welded in accordance with a predetermined design. The resulting structure is therefore rigid, inflexible, and not well-adapted to absorbing impacts.

The assembly of such metallic extruded tubes is carried out in a standardized pattern and the parts are fastened to one another by local welded spots in a welding operation performed either manually or by robots.

Remaining parts such as the forks, the seat and the like are installed and fastened by bolts or other fastening means to their respective mounts after the frame is welded.

However, such welded spots may fail; the breaks in a conventional bicycle's frame are often found in the welded spots. The most vulnerable points are those located between the central, longitudinally disposed bar and the tube that engages the handlebar. Breakage also occurs between the tube that supports the seat and the central, longitudinally disposed bar. These breakages occur primarily due to the stress placed upon the bicycle by the weight of the cyclist and by the pushing, pulling, jerking, pounding, and twisting of the bicycle parts as the cyclist exerts maximum effort.

Conventional metallic frames are also quite heavy. Manufacturers of bicycles and the like are continually trying to develop damage-resistant yet light-in-weight materials.

Early bicycle frames were made of steel. Aluminum was later employed, followed by chrome and chrome libidinum. These materials are gradually being replaced by aluminum alloys having technological innovations that offer greater resistance to damage than pure aluminum. However, metallic frames are somewhat inconvenient since they are prone to bending and breaking when severe forces are applied to them.

Carbon fiber is another raw material presently used for manufacturing the frames of bicycles. It is light-in-weight and damage-resistant. It absorbs impacts better than metallic materials and therefore allows the bicycle to ride more smoothly and regularly across the ground with shocks of reduced intensity. Although carbon fiber is expensive, it outlasts metallic frames under the normal wear and tear of daily use and does not bend when subjected to severe impacts.

There is a need for a bicycle construction that is light-in-weight, built of durable, substantially non-breakable materials, that can be assembled quickly, that is extra strong in places where conventional bicycles most often break, and that is safe and comfortable to ride.

However, in view of the art considered as a whole at the time the present invention was made, it was not obvious to those of ordinary skill in the art how the identified needs could be fulfilled.

SUMMARY OF THE INVENTION

The long-standing but heretofore unfulfilled need for an improved bicycle construction having the above-identified features is now met by a new, useful, and non-obvious invention.

The novel bicycle construction includes a unitary frame having a generally "Y" shape collectively formed by a central longitudinal bar, a lower bar and an arcuate medial bar. The bars are disposed in a common plane and the unitary frame has a longitudinal axis of symmetry.

The central longitudinal bar and the lower bar are integrally formed with one another at a common leading end. The central longitudinal bar is bifurcated at its trailing end to form first and second rear wheel mounting members that are positioned on opposite sides of the longitudinal axis of symmetry of the unitary frame.

A first bore is formed in the common leading end of the central longitudinal bar and the lower bar to accommodate a handlebar tube. The first bore is a vertical bore when the unitary frame is positioned in a vertical plane and rotated so that the bicycle of which said unitary frame is a part is positioned in a horizontal plane.

A second bore is formed in a trailing end of the central longitudinal bar to accommodate a seat support tube and said second bore is vertically oriented when the unitary frame is positioned in a vertical plane and rotated so that the bicycle of which said unitary frame is a part is positioned in a horizontal plane.

A third bore is formed in a trailing end of the lower bar to accommodate an axle that supports a primary socket wheel. The third bore is a transverse, horizontally disposed bore when the unitary frame is positioned in a vertical plane and rotated so that the bicycle of which said unitary frame is a part is positioned in a horizontal plane.

The first rear wheel mounting member is formed integrally with the trailing end of the unitary frame and extends in trailing relation therefrom. The second rear wheel mounting member is also formed integrally with the trailing end of the unitary frame and extends in trailing relation therefrom. The first and second rear wheel mounting members are positioned on opposite sides of the longitudinal axis of symmetry of the unitary frame in equidistantly spaced apart relation thereto.

A fourth bore is formed in a trailing end of the first wheel mounting member and is positioned transversely to the longitudinal axis of symmetry of the unitary frame and horizontally when the unitary frame is positioned in a vertical plane and rotated so that the bicycle of which said unitary frame is a part is positioned in a horizontal plane. A fifth bore is formed in a trailing end of the second wheel mounting member and is also positioned transversely and horizontally when the unitary frame is positioned in a vertical plane and rotated so that the bicycle of which said unitary frame is a part is positioned in a horizontal plane.

The fourth and fifth bores are in cooperatively aligned relation to one another to support opposite ends of an axle that supports a secondary sprocket wheel.

The central longitudinal bar, the lower bar, and the arcuate medial bar collectively form a generally triangular-shaped unitary frame having a generally triangular-shaped opening in a central area bounded by the central longitudinal bar, the lower bar, and the arcuate medial bar.

The central longitudinal bar, the lower bar, and the arcuate medial bar each have a hollow construction. A generally triangular-shaped hollow interior is formed in the unitary frame by the collective hollow interiors of said central longitudinal bar, lower bar, and arcuate medial bar.

An important object of the invention is to provide a bicycle frame that is light-in-weight, robust in structure and thus resistant to damage.

Another important object is to provide a bicycle construction that facilitates fast assembly.

Another important object is to provide a bicycle that is comfortable and safe to ride.

These and other important objects, advantages, and features of the invention will become clear as this description proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
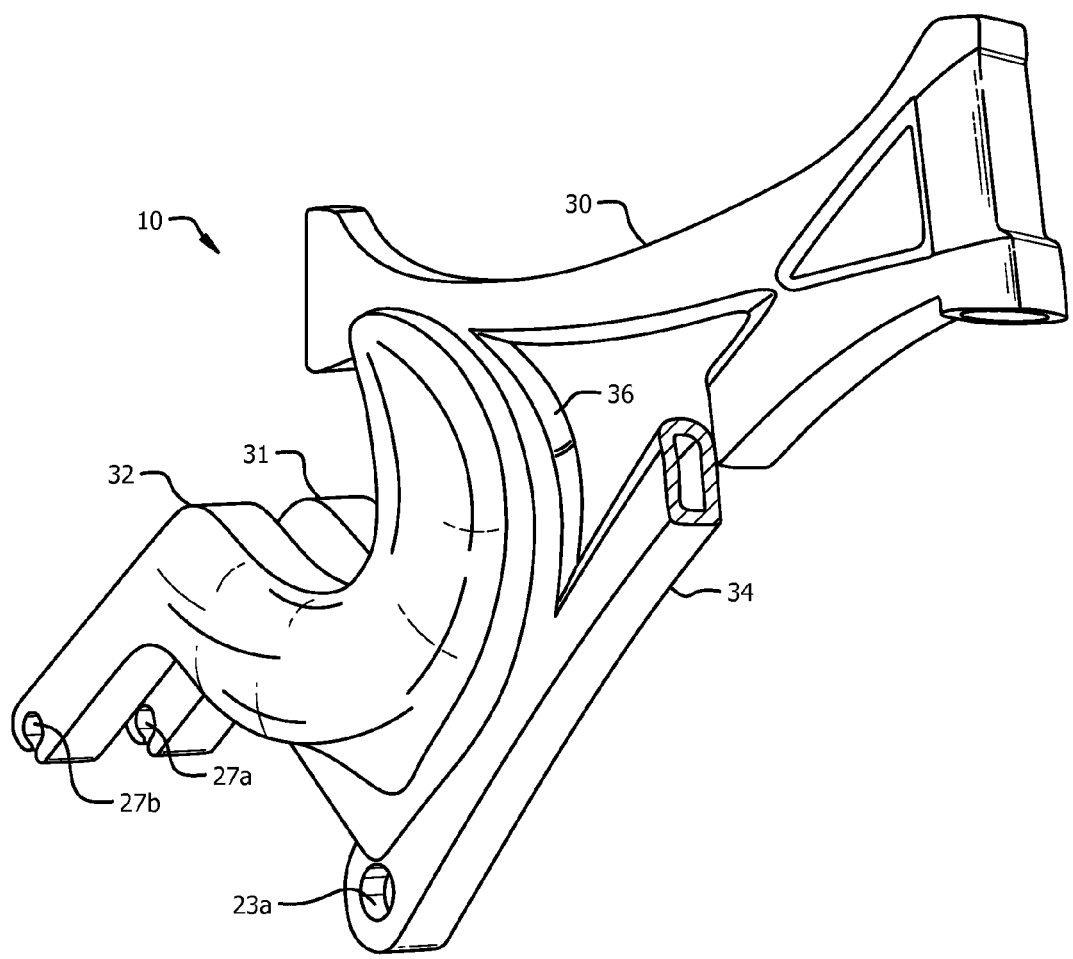
FIG. 1 is a perspective, partially cut-away view of the novel unitary frame.

FIG. 1 depicts an illustrative embodiment of the novel frame which is denoted as a whole by the reference numeral 10.

Figure 2:
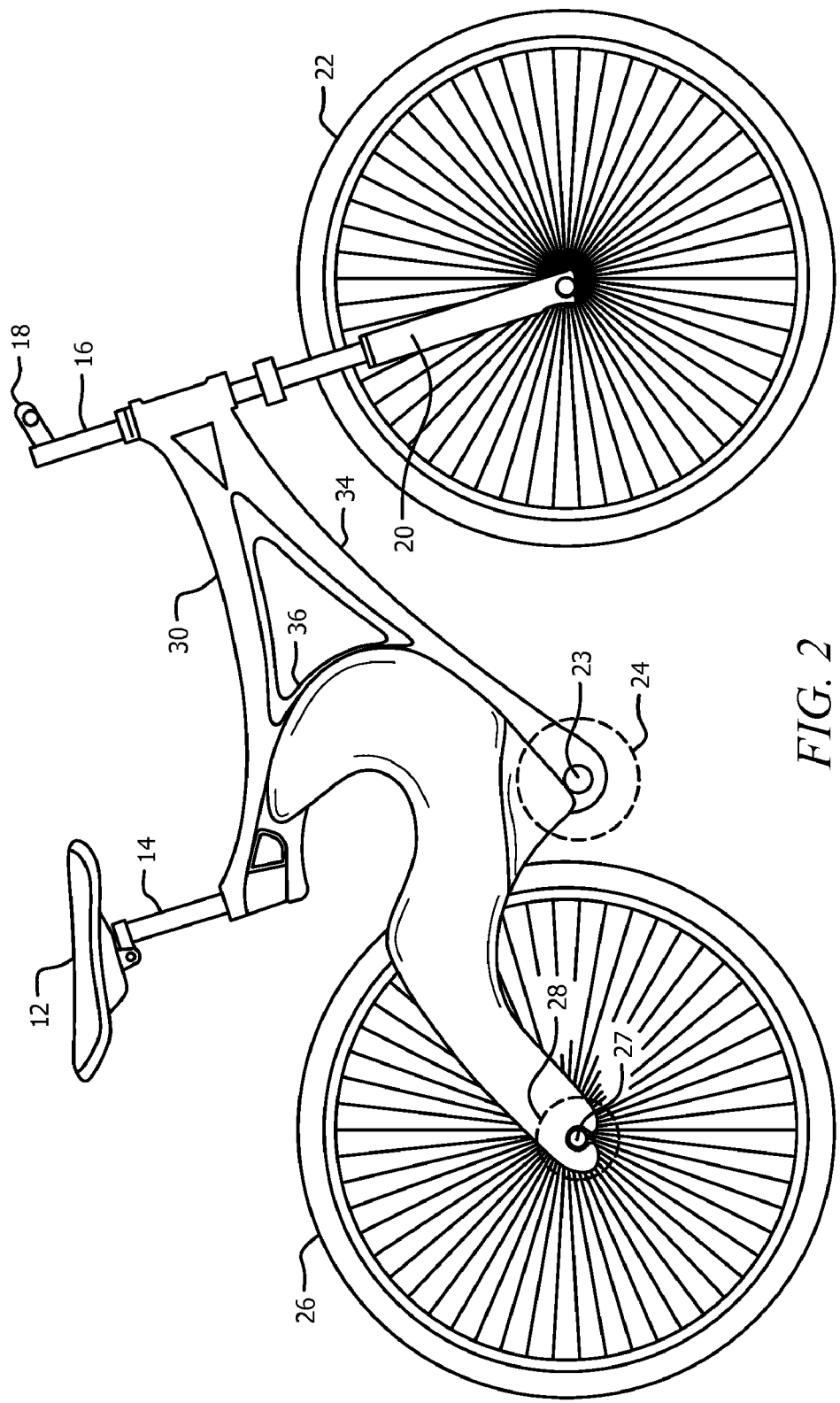
FIG. 2 is a side elevational view of a bicycle that incorporates the novel unitary frame.

As depicted in FIG. 2, hollow mono-block or unitary frame 10 engages the conventional parts that collectively form a bicycle such as seat 12, seat support tube 14 that enables seat height adjustment, handlebar tube 16 that supports handlebar 18, front fork 20 of front wheel 22, primary sprocket wheel 24, rear wheel 26 and secondary sprocket wheel 28.

Figure 3:
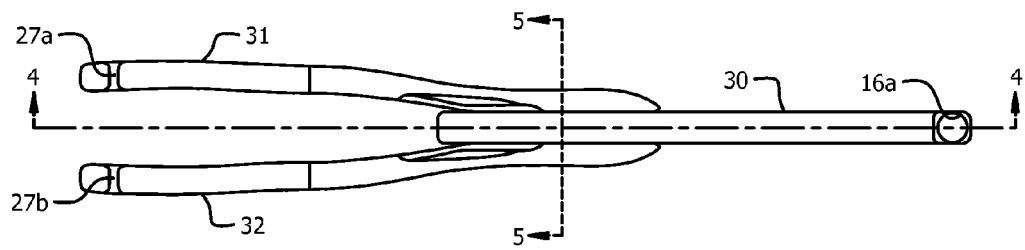
FIG. 3 is a top plan view of the novel unitary frame.

Referring again to FIG. 1, unitary frame 10 is a hollow structure that is wholly molded with rigid virgin or recycled polymer made into a single piece. Unitary frame 10 includes central longitudinal bar 30 having hollow interior 30a (FIG. 4), first rear wheel mounting member 31 (FIG. 1) formed integrally with central longitudinal bar 30, positioned to the left of rear wheel 26 and having hollow interior 31a (FIG. 5), and second rear wheel mounting member 32 formed integrally with central longitudinal bar 30, positioned to the right of rear wheel 26, and having hollow interior 32a (FIG. 5). Said first and second rear wheel mounting members 31, 32 are also positioned on opposite sides of a longitudinal axis of symmetry of unitary frame 10 as best understood in connection with FIG. 3.

Transverse bore 27a is formed in the distal end of first rear wheel mounting member 31 and transverse bore 27b is formed in the distal end of second rear wheel mounting member 32. Said transverse bores 27a, 27b receive opposite ends of axle 27 (FIG. 2) that supports secondary sprocket wheel 28.

Figure 4:
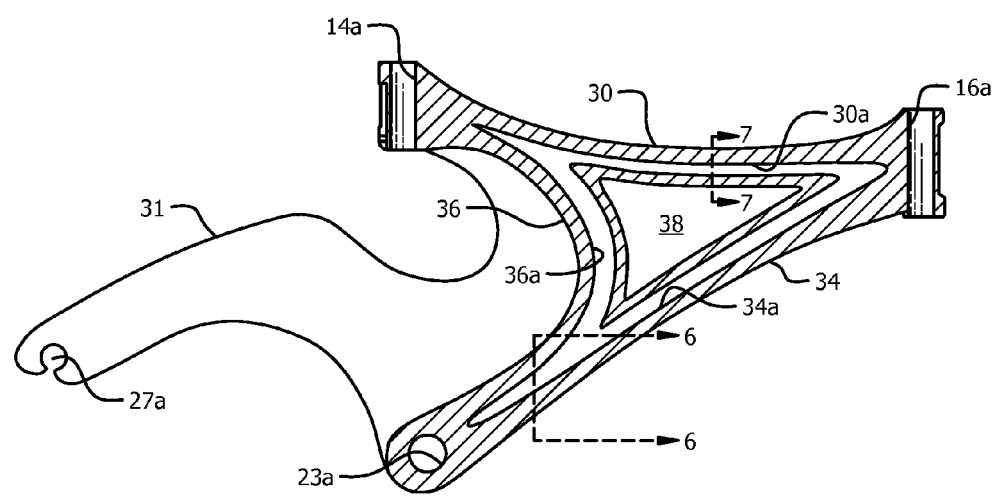
FIG. 4 is a sectional view taken along line 4-4 in FIG. 3.
Figure 5:
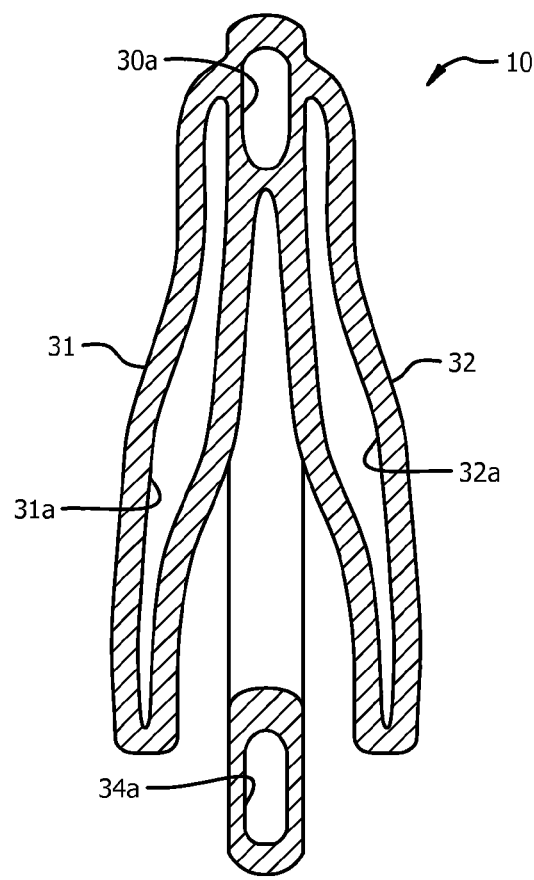
FIG. 5 is a sectional view taken along line 5-5 in FIG. 3.

As depicted in FIG. 4, first vertical bore 14a is formed in a first end of central longitudinal bar 30 and second vertical bore 16a is formed in a second end of central longitudinal bar 30. First vertical bore 14a accommodates seat support tube 14 and second vertical bore 16a accommodates handlebar tube 16.

Unitary frame 30 further includes lower bar 34 having transverse bore 23a (FIG. 1) formed in its lowermost end for receiving axle 23 (FIG. 2) that supports primary socket wheel 24. The hollow interior of lower bar 34 is denoted 34a in FIG. 4.

Central longitudinal bar 30 and lower bar 34 are interconnected by arcuate medial bar 36 having hollow interior 36a. Central longitudinal bar 30, lower bar 34, and arcuate medial bar 36 collectively form a "Y" shape that defines central open space 38 as best understood in connection with FIG. 4. Vertical bores 14a, 16a and transverse bore 23a are positioned at the three (3) vertices of the "Y" shape.

Figure 6:
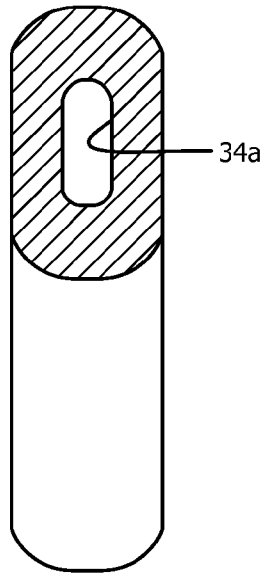
FIG. 6 is a sectional view taken along line 6-6 in FIG. 4.
Figure 7:
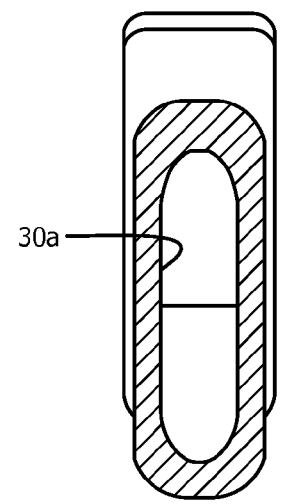
FIG. 7 is a sectional view taken along line 7-7 in FIG. 4.

As indicated in FIGS. 4-7, first and second rear wheel mounting members 31, 32 and lower bar 34 are thicker in cross-section and have a greater concentration of mass than central longitudinal bar 30 at its mid-region. Central longitudinal bar 30 has greater thickness and mass at its opposite ends as depicted to provide enhanced strength for seat tube 14 and handlebar tube 16. Lower tube 34 has increased mass and thickness at its uppermost end to provide enhanced support for handlebar tube 16 and at its lowermost end to provide enhanced support for axle 23.

Mono-block frame 10 may be formed of opaque or translucent materials or it may be made with a preselected pigmentation. The polymer employed in the manufacture of the mono-block frame may be a virgin or a recycled polymer such as polyethylene terephthalate (PET).

Mono-block frame 10 may be provided in a variety of colors since said frame after having passed the injection process might have an opaque or translucent appearance with an adequate pigmentation which is associated with the polymer itself or even might have the natural pigmentation from the PET.

Advantageously, the main central longitudinal bar and the parts formed integrally therewith are molded so that the inner portions thereof are hollow and preselected portions thereof are made with variations in volume of materials and designed with variation of material volume in pre-selected points during the injection molding of the parts. This provides strong reinforcement of the unitary frame parts that engage the conventional parts that collectively form a bicycle, thus providing greater flexibility, impact resistance, and enhanced mechanical strength to the assembled bicycle.

The novel frame is designed to engage the parts that make up a bicycle, such as the wheels, the handlebar and the seat in order to make the bicycle lighter in weight and more resistant to impact, thus enabling the practice of bicycle sports in a comfortable and safe manner It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A bicycle frame, comprising:

said bicycle frame having an integrally formed, unitary frame;

said unitary frame collectively formed by a central longitudinal bar, a lower bar and an arcuate medial bar, said bars being disposed in a common plane and said unitary frame having a longitudinal axis of symmetry;

said unitary frame made of a material selected from a group of materials including opaque materials, translucent materials, or materials having a preselected pigmentation;

said central longitudinal bar and said lower bar being integrally formed with one another at a common leading end and diverging from one another so that their respective trailing ends are spaced apart from one another in said common plane;

said central longitudinal bar having a greater thickness and greater volume of virgin or recycled polymer at its opposite ends to provide enhanced strength for a seat tube and a handlebar tube;

said arcuate medial bar having a hook-shaped configuration and having a greater volume of virgin or recycled polymer so as to provide enhanced strength to the unitary frame;

a first bore formed in said common leading end to accommodate a handlebar tube;

said first bore being a vertical bore when said unitary frame is positioned in a vertical plane and oriented so that both wheels of a bicycle assembled to said unitary frame are supported on a horizontal support surface;

a second bore formed in a trailing end of said central longitudinal bar to accommodate a seat support tube, there being an open space below said second bore;

said second bore being a vertical bore when said unitary frame is positioned in a vertical plane and oriented so that both wheels of a bicycle assembled to said unitary frame are supported on a horizontal support surface;

a third bore formed in a trailing end of said lower bar to accommodate an axle that supports a primary socket wheel;

said third bore being a first transverse bore when said unitary frame is positioned in a vertical plane and oriented so that both wheels of a bicycle assembled to said unitary frame are supported on a horizontal support surface;

a first rear wheel mounting member formed integrally with said trailing end of said unitary frame and extending in trailing relation therefrom;

a second rear wheel mounting member formed integrally with said trailing end of said unitary frame and extending in trailing relation therefrom;

said first and second rear wheel mounting members being positioned on opposite sides of said longitudinal axis of symmetry of said unitary frame in equidistantly spaced apart relation thereto;

a fourth bore formed in a trailing end of said first wheel mounting member;

said fourth bore being a second transverse bore when said unitary frame is positioned in a vertical plane and oriented so that both wheels of a bicycle assembled to said unitary frame are supported on a horizontal support surface;

a fifth bore formed in a trailing end of said second wheel mounting member;

said fifth bore being a third transverse bore when said unitary frame is positioned in a vertical plane and oriented in said vertical plane so that both wheels of a bicycle assembled to said unitary frame are supported on a horizontal support surface;

said fourth and fifth bores being in cooperatively aligned relation to one another to support opposite ends of an axle that supports a secondary sprocket wheel.

2. The bicycle frame of claim 1, further comprising:

said central longitudinal bar, said lower bar, and said arcuate medial bar collectively forming a unitary frame having an opening in a central area bounded by said central longitudinal bar, said lower bar, and said arcuate medial bar.

3. The bicycle frame of claim 2, further comprising:

said central longitudinal bar, said lower bar, and said arcuate medial bar having a hollow construction.

4. The bicycle frame of claim 1, further comprising:

said frame formed of a virgin polymer.

5. The bicycle frame of claim 4, further comprising:

said virgin polymer being polyethylene terephthalate.

6. The bicycle frame of claim 1, further comprising:

said frame formed of a recycled polymer.

7. The bicycle frame of claim 6, further comprising:

said recycled polymer being polyethylene terephthalate.

* * * * *